Feb. 16, 1954 P. A. KETCHPEL 2,669,164
BROACHING MACHINE
Filed Oct. 27, 1947 3 Sheets-Sheet 1
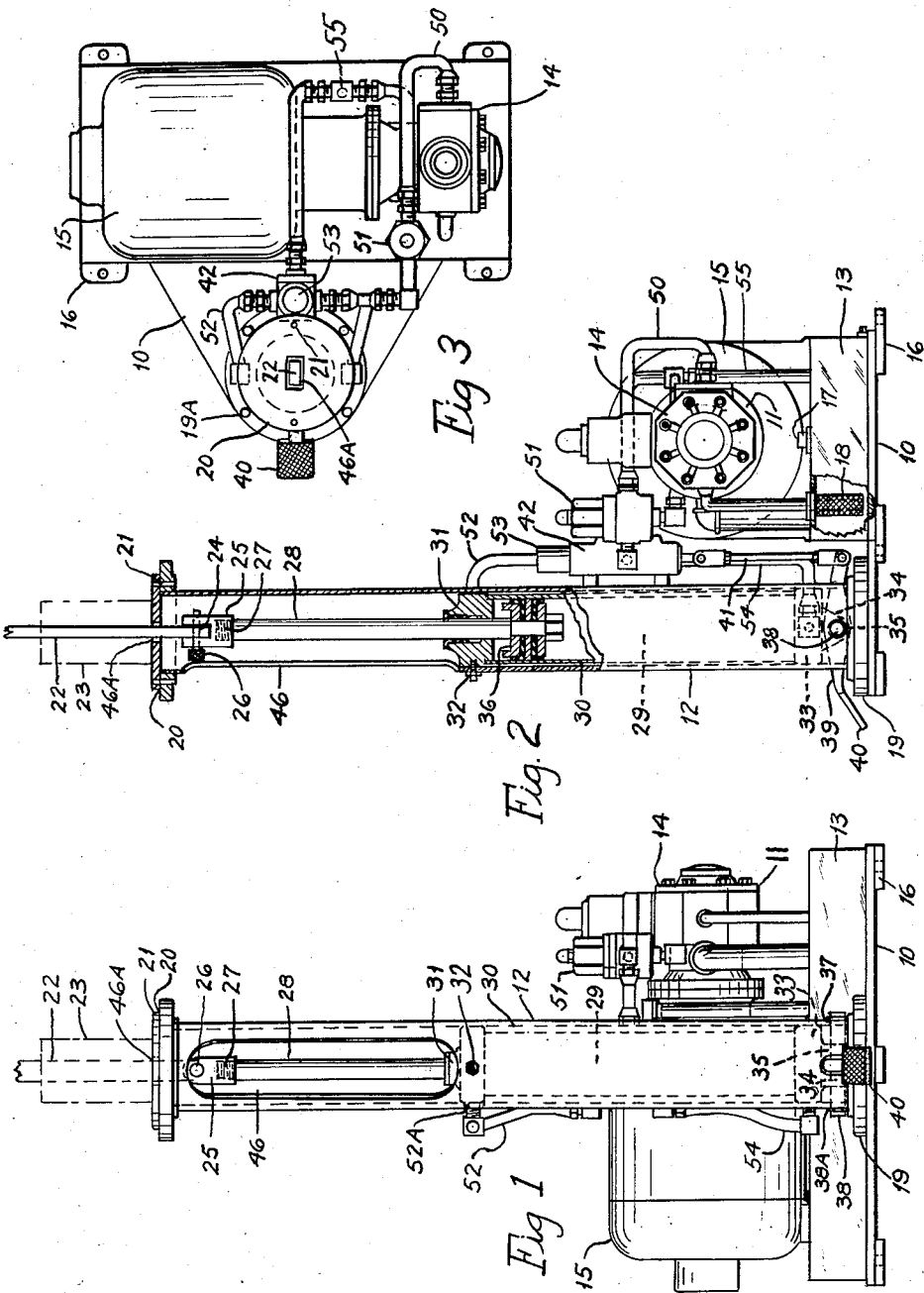
INVENTOR
Paul A. Ketchpel

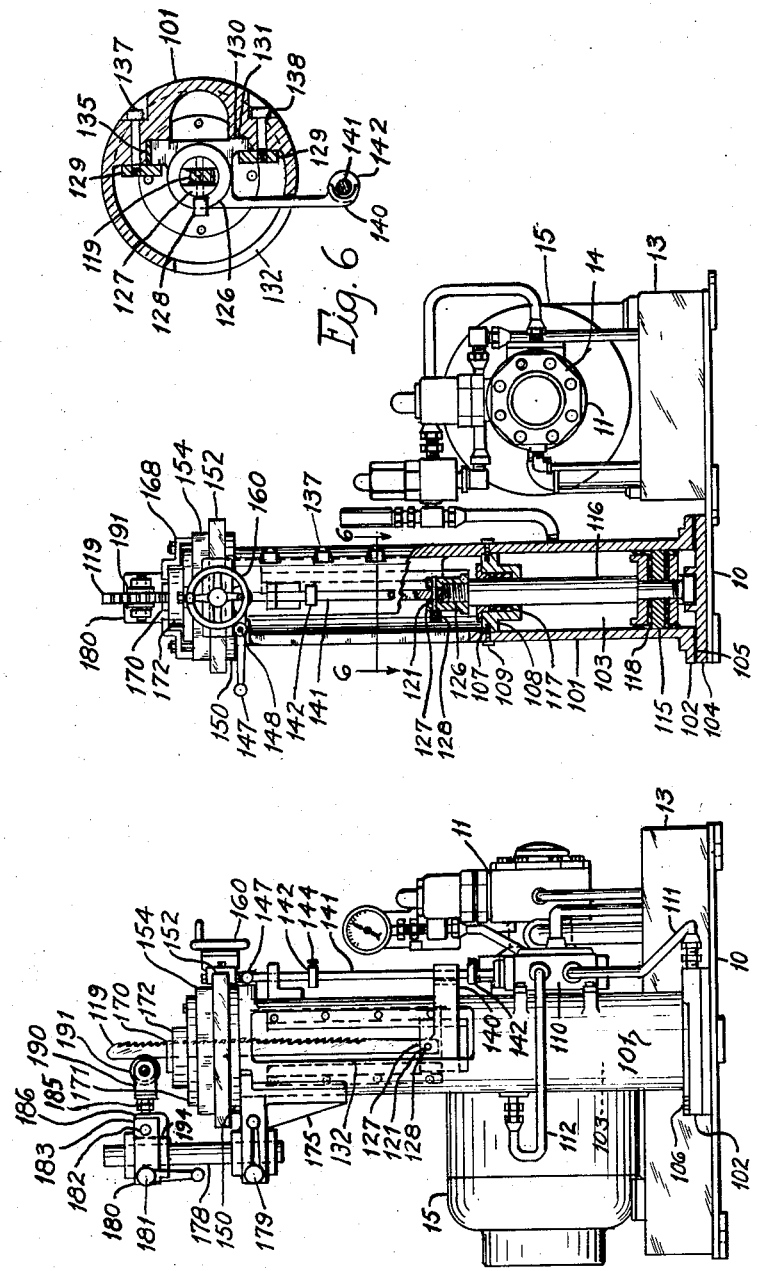

Feb. 16, 1954   P. A. KETCHPEL   2,669,164
BROACHING MACHINE
Filed Oct. 27, 1947   3 Sheets-Sheet 3
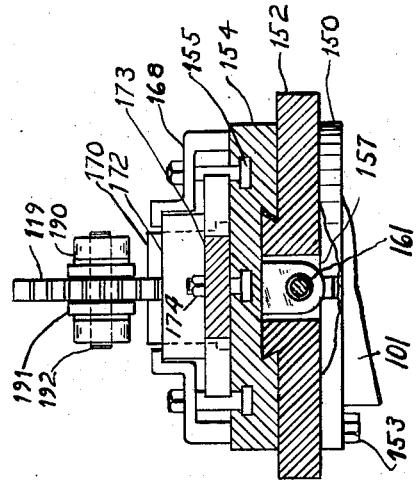
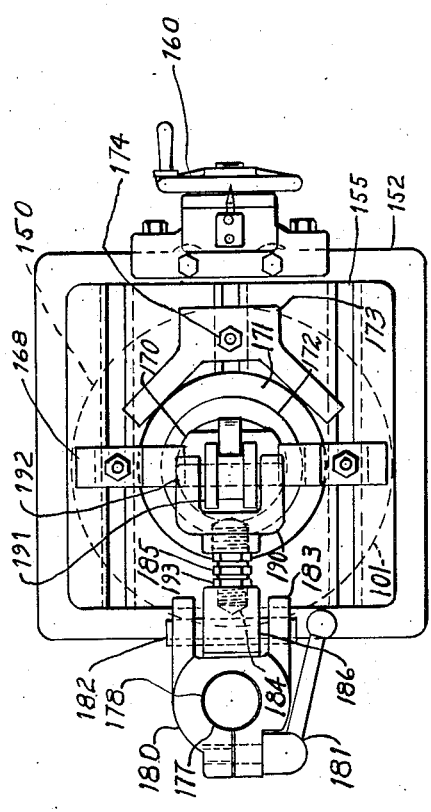
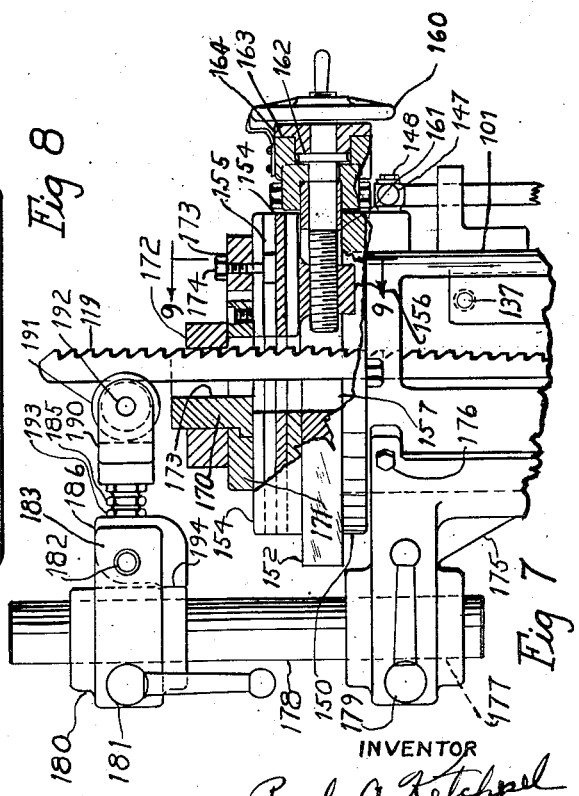
INVENTOR
Paul A. Ketchpel Patented Feb. 16, 1954

2,669,164

UNITED STATES PATENT OFFICE 2,669,164

BROACHING MACHINE

Paul A. Ketchpel, West Englewood, N. J., assignor to Ketchpel Engineering Company, West Englewood, N. J., a corporation of New Jersey Application October 27, 1947, Serial No. 782,269

5 Claims. (Cl. 90—33)

My invention relates to a new type hydraulic press which may be used for withdrawing steel mandrels from moulded plastic parts or for reciprocating a broach such as used for cutting key ways or forming other shapes in metal.

One object of this invention is to provide a very simple and compact machine that will withstand high forces with a minimum use of materials by reason of the efficient arrangement of the structures.

Another object is to provide a machine that can be manufactured cheaply from standard parts.

Another object is to provide a machine which will require less floor space than other types of machines now used to do the same work.

Another object is to provide a vertical acting arbor press wherein arbors or steel cores are pulled from products instead of being pushed.

A further object is to provide a work feeding mechanism for moving work into a broach and a cooperating broach back-up mechanism which swings away upon the initial movement of its return stroke to relieve damaging pressure on the cutting teeth.

Another object is to provide a simple, compact, and inexpensive powerful pulling mechanism which may be used for shearing of dies, drawing or forming metal parts.

Another object is to provide a vertical acting power mechanism with control mechanism combined therewith for causing the power mechanism to reciprocate continuously and be adjustable in its stroke.

Still another object is to provide an integral base for a hydraulic power press and a hydraulic power pump, the oil reservoir for the pump being formed in the housing of the base.

To the above and other ends which will hereinafter appear this invention consists in the features of construction and combinations and arrangements of parts hereinafter described and particularly pointed out in the claims.

In the accompanying drawings, forming part of this specification, and in which like numerals are employed to designate like parts throughout.

Figure 1 is a front elevation view of the machine when built for withdrawing arbors or steel cores from products.

Figure 2 is a side elevation partly in section illustrating the arrangement of the hydraulic cylinder.

Figure 3 is a plain view of the power press shown in Figure 2.

Figure 4 is a front elevation of the machine illustrating its construction when built for reciprocating broaches or other metal cutting or forming tools.

Figure 5 is a side elevation view of Figure 4 with some parts broken away to disclose the hydraulic piston and associated parts.

Figure 6 is a vertical section taken on the line 6—6 of Figure 5 illustrating a cross-head and guide mechanism which may be used to rigidly support the lower end of a broach.

Figure 7 is an enlarged view of the upper portion of the mechanism shown in Figure 4, particularly illustrating the work supporting table. Also illustrates how the rack is supported at its upper end.

Figure 8 is a plan view of the mechanism shown in Figure 7.

Figure 9 is a sectional view taken on the line 9—9 of Figure 7 illustrating the construction of the work table.

Refer now to Figures 1, 2 and 3.

It should be noted that bolting pads 16 have been provided on the base plate 10. Also that the oil compartment 13 is provided with a filler plug 17 and a supply pipe screen 18 both of which are component parts of the oil reservoir.

The housing 12 may be constructed of standard pipe provided with a flange 19 and 20 screwed on its lower and upper ends, the flange 19 being secured to the base 10 with bolts 19A or welded integral therewith. The upper pipe flange 20 provides a horizontal work table on which the work rests by gravity. A plate, vice or fixture may be located on the table or made integral therewith for supporting products on which work is to be done. Bolts or dowel pins 21 may be used to maintain alignment. It will be understood hereafter that reference to the work table may comprise both the flange and the fixture. It is apparent for the purpose described that a vertical housing having a horizontal table is better than a horizontal housing with a vertical work table.

This modification of the invention is highly useful for withdrawing mandrels, or forming bar 22 from moulded plastic products, represented by the dot-and-dash line 23. Since they are moulded together under heat and tremendous high pressure it requires a very great force to remove the mandrel. Such mandrels are thin and slender and of such length that they fail as a column when an ordinary arbor press is used to press them out. Bending of the mandrel also splits open and ruins the moulded part.

Each mandrel 22 is provided at least at one end with a notch or pin hole 24, or other means, for connecting it to a pull-head 25 which is also provided with a hole or means for engaging the mandrel, tool or forming-bar 22. In this case the end of the mandrel is engaged in a forked pull-head 25 and a pin 26 is pushed through the hole 24 to lock them together. The pull-head 25 is also provided with a threaded hole 27 for mounting it on the piston rod 28. However the claims hereinafter listed are not confined to any particular means of connecting the piston rod and forming-bar.

One of the chief advantages of this invention is achieved by mounting an inexpensive hydraulic ram 29 of well known construction within the tubular column-like housing. It comprises: a cylinder 30 and upper c cylinder head 31 which is adjustably positioned and secured in proper alignment with the mandrel 22 by the cap bolts 32; a lower cylinder head 33 is provided with a clevis or forked end 34 and the customary pin hole 35; and the piston 36 mounted on the piston rod 28.

The housing 12 is provided with a lateral through-hole 37 permitting a pin 38 to be assembled through the housing and clevis to anchor the cylinder at its lower end to the housing. Snap rings 38A are used to restrain end-wise movement of the pin. A valve lever 39 is advantageously mounted on the same pin in the space between the forks of the clevis. A treadle 40 on the lever extends out to the front of the housing for foot operation. The opposite end of the lever connects through a linkage 41 to a hydraulic control valve 42 mounted on the rear wall of the vertical housing and in line with the valve lever.

An aperture 46 is provided on the front side of the housing of sufficient width to permit access to the locking means 26 at any position of the stroke of the piston. The table or fixture 20 is also apertured at 46A for the forming-bar to pass through.

Rotation of the hydraulic pump 14 by the electric motor 15 pumps oil from the reservoir 13 and delivers it under pressure through the pipe line 50 past a relief valve 51 to the control valve 42 and then through line 52 and an aperture in the housing to the upper cylinder head 31 and exerts force on top of the piston 36. Hydraulic pressure on the piston 36 provides the great force and slow even pressure so essential in breaking loose a mandrel or metal core from a moulded part without crushing its side walls.

After the mandrel has been completely withdrawn the product is removed from the work table, the pin 26 is removed, the mandrel taken out and pressure on foot treadle 40 removed. The valve 42 is automatically shifted by a spring in the housing 53 of the valve 42. Thus the ports are changed and oil is delivered under pressure through the line 54 to raise the piston 36 pushing out the oil above it through the line 52, valve 42 and returning it through the line 55 to the oil reservoir 13.

The invention hereafter described and shown in Figures 4 to 9 is useful for broaching keyways, or doing pressing and forming operations.

The construction of the base plate 10, hydraulic unit 11, compartment for the oil reservoir 13 and the mounting of the motor 15 are so arranged as to provide a very simple and compact machine which is cheap to manufacture.

The construction of this machine provides extreme high pulling power with the frame structure so arranged as to require a minimum of materials. A tubular housing 101 is provided with a flange 102 formed integral therewith. The vertical housing 101 is bored out at its lower end to provide a hydraulic cylinder 103. A lower cylinder head 104, the housing flange 102, a gasket 105 are all bolted to the base plate 10 by bolts 106. The bore of the cylinder terminates at 107 and provides a shoulder against which the upper cylinder head 108 is assembled in the bore with sufficient pressure to form a hydraulic seal. However it may be sealed with other means and held in place by bolts 109 if desired.

A piston 115 assembled to a piston rod 116 reciprocates in the cylinder. A seal 117 is provided in the upper cylinder head 108 for the piston rod. The piston is of well known construction and may be equipped with leather cups or O rings 118. Means for cushioning the piston is provided at each end of the stroke. This assembly constitutes a ram.

The hydraulic pump 14 supplies fluid under pressure to the control valve 110 from where it is distributed through the pipes 111 and 112 to the opposite ends of the piston 115 and reciprocates the piston and piston rod 116 in the cylinder 103 to pull down a forming-bar or broach 119 to do useful work as will be described later. The forming-bar or broach 119 is provided with means at its lower end for securely connecting it to the piston rod 116. Such means may comprise a hole 121 or other conditions for this purpose.

If desired a connecting means 126 may have a threaded hole at its bottom and be screwed on to the piston rod 116 and have a forked clevis connection 127 at its upper end so that a pin 128 may be used to conveniently engage through the hole of each to connect the piston rod 116 and the bar 119. The connecting means 126 may take shape in the form of a cross-head and have laterally extending legs 130 slidably mounted in guide ways 131 on the inside wall of the tubular housing 101. Guide covers 129 confine the cross-head in the guides in one direction. If desired a hardened wearing strip 135 may be used as clearly shown in Figure 6, to maintain accurate alignment of the cross-head 126 and piston rod 116 in a plane 90° from the guide plates and takes the thrust of the broach. Bolts 137 are assembled from the outside through apertures 138 and recesses in the outside casing to bolt the guide covers 129 in place. The housing 101 is provided with an elongated aperture 132 in its upper wall for machining the guides and providing access to the piston rod and forming bar connecting means.

The attaching means may also be provided with a valve reversing arm 140 extending out from the body of the cross head 126 beyond the housing wall to a valve rod 141. It is provided at its furthest extremity with means for engaging collars 142 on the valve rod 141. The collars are provided with set screws 144 for placing the collars at various positions on the valve rod 141 for varying the stroke of the piston 115. Thus the valve will be reversed at each end of the piston stroke to shift the valve rod and reverse the stroke of the piston. A hand lever 147 is pivoted on a bolt 148 mounted in the upper end of the housing for manually actuating the valve mechanism to stop or start the piston anywhere between the extreme positions as desired.

The housing 101 is provided at its upper end with a flange or horizontal work table 150. Being tubular it naturally has an aperture through the work table. Various types of plates, vices, fixtures and dies may be mounted on the work table according to the work being done. One such fixture is shown here in the form of a work feed mechanism best illustrated in Figures 7, 8 and 9.

The work feed mechanism comprises a base plate 152 which preferably is secured to the flange or work table 150 by bolts 153. A movable plate 154 equipped with T slots 155 is slidably engaged by dove-tail ways with the base plate 152 equipped with complementary ways. A threaded lug 156 protrudes downward from the central portion of the movable plate 154 into an aperture 157 in the base plate 152.

A hand wheel 160 is provided with a threaded shaft 161 for engagement with the threaded lug 156 for manually moving the table 154 as desired. The shaft 161 is equipped with a shoulder flange 162. The thrust of the shaft is taken between a casting 163 bolted to the plate 152 and a plate 164 bolted to the casting 163.

A broach guide such as 170 is bolted down on the movable plate by a broach guide clamping plate 171, both are apertured to permit the broach 119 to pass therethrough. A product shown at 172 in which a keyway is to be cut is assembled on a broach guide and is secured to the movable plate 154 by clamps 168 and a V-shaped back-up plate 173 which may be adjusted in various positions by a bolt 174 located in one of the T slots 155 in the movable plate 154.

Broaches used for cutting a keyway in a single stroke must be relatively long. Machines built for such a long travel must be likewise of long length which is a large factor in the investment of both. At present deep keyways are made with a short stroke machine by use of successive broaches usually requiring the use of a set of three. This involves loss of time to change the broaches and needless investment. For shallow keyways or certain machining operations the broach guide 170 may be used and will provide adequate support at 173 to back up a broach satisfactorily during the cut taken by one stroke.

For shallow keyways or certain broaching operations a broach guide similar to 170 could be mounted on an immovable plate and it would provide adequate support to back up a broach satisfactorily. In fact the present invention suggests a short stroke machine powerful and strong enough to pull a broach with sufficient taper to cut the keyway in one stroke but broach breakage would make this practice prohibitive. Preferably the present invention proposes to provide a back up support for the broach and mount the work rigidly on a plate whereby the work can be fed toward the broach to permit cutting deep keyways with short broaches on a short stroke machine.

Accordingly a broach back-up mechanism is shown to comprise a bracket 175 cast integral with or bolted to the housing 101 by bolts 176. It is provided with a bored hole 177 in which a shaft 178 is securely mounted with a clamping screw 179. Mounted on the shaft 178 a block 180 is adjustably mounted and clamped by a clamping screw 181. It is provided with a hinge pin 182 in the fork 183.

A pivot block 186 is hinged between the forks on the pin 182 and is threaded at 184 to accommodate one end of a left and right hand threaded adjusting screw 185 which also screws into a fork 190 and supports a broach back-up roller 191 on the pin 192. Broaches of different breadths may be accommodated by adjusting the screw 185 and locking it with the lock nuts 193.

When a broach or forming bar is being pulled down the boss 194 on the lower side of the pivot block withstands some of the reaction on the block 180. When the broach or bar starts back up the broach back-up roller support swings upwardly until all the pressure is relieved on the broach teeth. Prior to the next downward stroke the hand wheel 160 is turned to move the work feed plate toward the broach.

On account of the adjustability provided in the broach back up mechanism and in the movable feed plate, keyways can be cut in various size holes without much set up as the use of the broach guide is not always essential because the broach is rigidly supported at its upper end by the back-up mechanism and by the crosshead at its lower end.

It is believed that the usefulness and objects of the invention is made clear and that it will be apparent that machines built in accordance with the specifications and drawings will accomplish the objects of the invention and will have many other uses such as the working, forming shearing, extruding of metals, plastic and other materials which will come within the scope of the following claims.

I claim:

1. In combination in a vertical acting hydraulic power press, an upright tubular housing provided with a finished bore in its lower part, an upper cylinder head closing the upper end of the cylinder, a ram comprising a piston rod extending up through the upper cylinder head and a piston mounted on its lower end for reciprocation in said cylinder, a lower cylinder head closing the cylinder at the lower end of the housing, a source of fluid pressure, fluid pressure supply lines extending from said source to both ends of said cylinder, valve mechanism included in said fluid pressure lines and being mounted on the outside wall of the upright tubular housing for alternatingly admitting fluid under pressure to opposite sides of said piston to reciprocate the piston, said housing having a work table at its upper end provided with an opening therein, a forming bar mounted for reciprocating through the opening and doing useful work, the upper part of said housing being provided with guideways and an elongated aperture in its side walls, means for connecting and supporting the piston rod and the forming bar in accurate alignment, said means comprising a cross-head with lateral extensions arranged for reciprocation in said guideways and having a valve reversing arm which extends out through the elongated aperture in the housing side wall and operates the valve mechanism at the end of each piston stroke, said source of fluid pressure comprising a reservoir for the fluid, a motor and a pump for circulating the fluid from the reservoir to the ram and returning it thereto, a common base plate for mounting the vertical acting power press and the motor and hydraulic pump, said reservoir comprising a housing on which the motor and pump are mounted and being formed in said base plate.

2. In combination in a vertical acting hydraulic power press, an upright housing provided with a supporting flange at its base, a hydraulic ram provided in the lower part of said housing and having a piston and piston rod, a source of fluid pressure, fluid pressure supply lines extending from said source to upper and lower ends of said ram, a valve mechanism for admitting fluid under pressure to opposite sides of said piston to reciprocate the same, said housing having a flange at its upper end with an opening therethrough, providing a work table, a broach mounted for reciprocating through the opening in said work table and connected with said piston rod, a broach back-up mechanism comprising a base casting adapted for mounting on the upper portion of the housing, and provided with a hole in which a post may be adjustably clamped, a vertical post, a pivot block provided with a hole for adjustably clamping it to the vertical post, and a fork provided with a broach guide roller pivotedly mounted to said pivot block.

3. In combination in a vertical acting hydraulic power press, an upright housing provided with a supporting flange at its base, a hydraulic ram provided in the lower part of said housing and having a piston and piston rod, a source of fluid pressure, fluid pressure supply lines extending from said source to upper and lower ends of said ram, a valve mechanism for admitting fluid under pressure to opposite sides of said piston to reciprocate the same, said housing having a flange at its upper end with an opening therethrough, providing a work table, a broach mounted for reciprocation through the opening in said work table and connected with said piston rod, a broach back-up mechanism comprising a post rigidly mounted to the vertical housing, and being provided with a pivot, a fork pivotedly mounted in said pivot, a broach guide roller mounted in said fork, said fork normally positioned at right angles with the back of the broach, means on said fork to restrain motion with the broach during the cutting stroke, but freely permitting swinging movement about its pivot with the broach to relieve pressure on the teeth during the return stroke.

4. In combination in a vertical acting hydraulic power press, an upright housing provided with a supporting flange at its base, a hydraulic ram provided in the lower part of said housing and having a piston and piston rod, a source of fluid pressure, fluid pressure supply lines extending from said source to upper and lower ends of said ram, a valve mechanism for admitting fluid under pressure to opposite sides of said piston to reciprocate the same, said housing having a flange at its upper end with an opening therethrough, providing a work table, a broach mounted for reciprocation through the opening in said work table connected with said piston rod, a broach back-up mechanism comprising a post rigidly mounted to the vertical housing, and being provided with a pivot, a fork pivotally mounted in said pivot, a broach guide roller mounted in said fork, said fork normally positioned at right angles with the back of the broach, means on said fork to restrain motion with the broach during its cutting stroke, but freely permitting swinging movement about its pivot with the broach to relieve pressure on the teeth during the return stroke, a work supporting mechanism comprising a base plate mounted on the work table of the housing provided with guide ways, a movable plate provided with complementary ways and mounted in said base plate, a feed screw associated with both of last mentioned plates and a broach guide mounted on said movable plate for supporting the work and guiding the broach.

5. In combination in a vertical acting hydraulic power press, an upright housing provided with a supporting flange at its base, a hydraulic ram provided in the lower part of said housing and having a piston and piston rod, a source of fluid pressure, fluid pressure supply lines extending from said source to upper and lower ends of said ram, a valve mechanism for admitting fluid under pressure to opposite sides of said piston to reciprocate the same, said housing having a flange at its upper end providing a work table and having an opening therethrough, said housing provided with guideways at its upper end, a broach mounted for reciprocation through the opening in said work table and connected with said piston rod, said connecting means comprising a crosshead having lateral extensions mounted in said guideways, a work supporting mechanism comprising a base plate mounted on the work table of the housing, provided with guideways, a movable plate provided with complementary ways and mounted in said base plate, a feed screw associated with both of last mentioned plates and a broach guide mounted on said movable plate for supporting the work and guiding the broach, said movable plate providing means for positioning the work in the proper location for mounting the broach, broach guide and crosshead in alignment with the housing guideways.

PAUL A. KETCHPEL.

References Cited in the file of this patent

UNITED STATES PATENTS

| Number | Name | Date |
|---|---|---|
| 388,946 | Benson | Sept. 4, 1888 |
| 1,028,825 | La Pointe | June 4, 1912 |
| 1,344,510 | Hilliard | June 22, 1920 |
| 1,468,595 | Ferris | Sept. 18, 1923 |
| 1,685,760 | West | Sept. 25, 1928 |
| 1,937,121 | La Pointe | Nov. 28, 1933 |
| 2,252,036 | Rummer | Aug. 12, 1941 |

FOREIGN PATENTS

| Number | Country | Date |
|---|---|---|
| 151,364 | Great Britain | Sept. 23, 1920 |